(12) United States Patent
Chen et al.

(10) Patent No.: US 7,015,716 B2
(45) Date of Patent: Mar. 21, 2006

(54) METHOD FOR DETECTING A POWER LOAD OF A POWER SUPPLY MODULE ACCORDING TO DUTY CYCLE DETECTION, AND RELATED DEVICE

(75) Inventors: Tseng-Wen Chen, Jubei (TW); Chun-Kan Huang, Jubei (TW)

(73) Assignee: Feature Integration Technology Inc., Hsinchu (TW)

( * ) Notice: Subject to any disclaimer, the term of this patent is extended or adjusted under 35 U.S.C. 154(b) by 0 days.

(21) Appl. No.: 10/907,654

(22) Filed: Apr. 11, 2005

(65) Prior Publication Data

US 2005/0225351 A1    Oct. 13, 2005

(30) Foreign Application Priority Data

Apr. 13, 2004    (TW) ................................ 93110232 A

(51) Int. Cl.
*G01R 31/36*    (2006.01)
(52) U.S. Cl. .................. 324/771; 324/537; 324/158.1; 324/765
(58) Field of Classification Search ...................... None
See application file for complete search history.

(56) References Cited

U.S. PATENT DOCUMENTS

| | | | | |
|---|---|---|---|---|
| 5,099,145 A | * | 3/1992 | Higasa et al. | 307/140 |
| 6,373,730 B1 | * | 4/2002 | Komatsu et al. | 363/41 |
| 6,621,256 B1 | * | 9/2003 | Muratov et al. | 323/282 |
| 6,643,128 B1 | | 11/2003 | Chu et al. | |
| 2004/0003305 A1 | * | 1/2004 | Tokunaga | 713/300 |

FOREIGN PATENT DOCUMENTS

| | | |
|---|---|---|
| TW | 330255 | 4/1998 |
| TW | 535050 | 6/2003 |

* cited by examiner

*Primary Examiner*—Jermele Hollington
*Assistant Examiner*—Jimmy Nguyen
(74) *Attorney, Agent, or Firm*—Winston Hsu

(57) ABSTRACT

A method for detecting a power load of a power supply module, includes: receiving a pulse width modulation (PWM) signal generated by the power supply module, wherein the PWM signal is utilized for controlling a driving voltage outputted from the power supply module; detecting a duty cycle of the PWM signal; and determining the power load of the power supply module according to the duty cycle.

19 Claims, 4 Drawing Sheets

METHOD FOR DETECTING A POWER LOAD OF A POWER SUPPLY MODULE ACCORDING TO DUTY CYCLE DETECTION, AND RELATED DEVICE

BACKGROUND OF INVENTION

1. Field of the Invention

The present invention relates to power load detection, and more particularly, to a method for detecting a power load of a power supply module according to duty cycle detection, and related devices.

2. Description of the Prior Art

Detection of a power load of a power supply module in a computer system is typically implemented utilizing a power load sensor such as a resistor coupled to an output terminal of the power supply module in order to sense the working current outputted from the terminal. The power load can be calculated according to the working current, where the magnitude of the working current can be detected by measuring a voltage difference between two ends of the resistor. However, applying the resistor to this application introduces a problem of additional power consumption due to the resistor.

Another way for detecting the power load of the power supply module mentioned above is deriving a specific parameter corresponding to the power load from an operation system (OS) executed in the computer system, where the specific parameter is typically provided by a central processing unit (CPU) of the computer system. Sometimes, utilizing the OS to detect the power load introduces another problem of delay due to software control. Therefore, the power load is not detected in real time.

In the computer system, control of certain components' working parameters such as working currents, working voltages, and/or working frequencies are typically performed according to the power load detection. Thus, the problems mentioned above may degrade the performance of the computer system if the working parameters are not properly controlled.

SUMMARY OF INVENTION

It is an objective of the claimed invention to provide a method for detecting a power load of a power supply module according to duty cycle detection, and related devices.

A method for detecting a power load of a power supply module is disclosed. According to one embodiment, the method comprises: receiving a pulse width modulation (PWM) signal generated by the power supply module, wherein the PWM signal is utilized for controlling a driving voltage outputted from the power supply module; detecting a duty cycle of the PWM signal; and determining the power load of the power supply module according to the duty cycle.

A power load detection device for detecting a power load of a power supply module is further disclosed. According to one embodiment, the power load detection device comprises: a detection circuit for receiving a PWM signal generated by the power supply module and detecting a duty cycle of the PWM signal, wherein the PWM signal is utilized for controlling a driving voltage outputted from the power supply module; and a determining circuit coupled to the detection circuit for determining the power load of the power supply module according to the duty cycle.

A power supply module capable of detecting a power load thereof is further disclosed. According to one embodiment, the power supply module comprises: a PWM controller for generating or controlling a PWM signal, wherein the PWM signal is utilized for controlling a driving voltage outputted from the power supply module; a detection circuit for receiving the PWM signal and detecting a duty cycle of the PWM signal; and a determining circuit coupled to the detection circuit for determining the power load of the power supply module according to the duty cycle.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
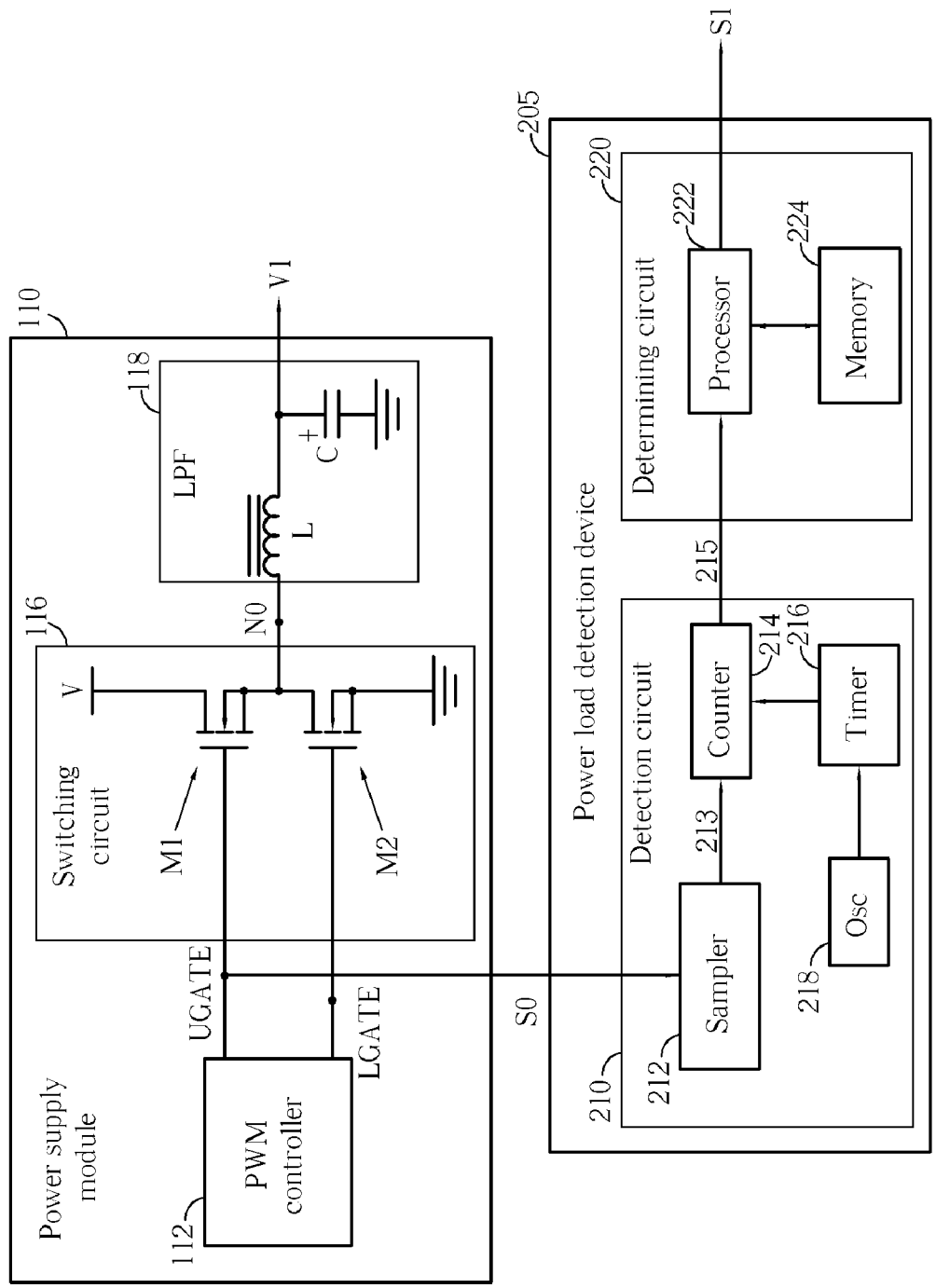
FIG. 1 is a diagram of a power load detection device coupled to a power supply module according to one embodiment of the present invention.

Please refer to FIG. 1. FIG. 1 is a diagram of a power load detection device 205 coupled to a power supply module 110 according to a first embodiment of the present invention. According to this embodiment, both of the power load detection device 205 and the power supply module 110 are positioned in a computer system (not shown). The power supply module 110 comprises a pulse width modulation (PWM) controller 112, a switching circuit 116, and a low pass filter (LPF) 118, where the switching circuit 116 comprises two transistors M1 and M2, and the LPF 118 comprises an inductor L and a capacitor C. In addition, the power load detection device 205 comprises a detection circuit 210 and a determining circuit 220, where the detection circuit 210 comprises a sampler 212, a counter 214, a timer 216, and a oscillator 218, and the determining circuit 220 comprises a processor 222 and a memory 224.

The PWM controller 112 outputs a first control signal through a node UGATE and a second control signal through another node LGATE to control the transistors M1 and M2 respectively, where the second control signal is an inverted signal of the first control signal. Each of the first and second control signals is a PWM signal, whose duty cycle is determined by the PWM controller according to a feedback signal (not shown) corresponding to a driving voltage V1 outputted from the power supply module 110. The duty cycle mentioned above is typically defined as follows. In a signal comprising an ideal pulse train, i.e., a pulse train having rectangular pulses, the duty cycle of the pulse train is the ratio of the pulse duration to the pulse period. For example, the duty cycle is 0.25 for a pulse train in which the pulse duration is 1 ms and the pulse period is 4 ms. While the pulse period Tp of the first control signal is constant, i.e., the time period corresponding to each cycle of the first control signal is equal to Tp, the PWM controller 112 is capable of adjusting the duty cycle of the first control signal (by determining various pulse durations) in accordance with the power load related to the driving voltage V1, in order to maintain the voltage level of the driving voltage V1 in a predetermined range.

How the PWM controller 112 controls the driving voltage V1 utilizing the first and second control signals is described as follows. As mentioned, the second control signal is an inverted signal of the first control signal. If the first control signal is at a high level, the second control signal is at a low level. Similarly, if the first control signal is at a low level, the second control signal is at a high level. Under control of the first and second control signals, the transistors M1 and M2 operate as switches but do not turn on or turn off at the same time. As a result, an intermediate signal transmitted through a node N0 alternately switches between two levels, which are approximately equal to a ground level and a level of a voltage V, respectively. Here, the intermediate signal is also a PWM signal and has the same duty cycle as that of the first control signal. The intermediate signal transmitted through the node N0 is then low pass filtered by the LPF 118 and converted into the driving voltage V1.

The detection circuit 210 is designed for detecting the duty cycle of a PWM signal S0 such as the first control signal outputted through the node UGATE, the second control signal outputted through the node LGATE, and the intermediate signal outputted through the node N0. According to this embodiment, the power load detection device 205 is coupled to the node UGATE and receives the first control signal to be the PWM signal S0. The sampler 212 receives the PWM signal S0 and samples the PWM signal S0 with a sampling frequency Fs to generate a plurality of sampled values outputted through a sampled value signal 213. Each of the sampled values is at either a first logic level or a second logic level, e.g., either a high level HL or a low level LL.

The detection circuit 210 may detect the duty cycle of the PWM signal S0 by detecting duty cycle information such as the number of sampled values of the high level HL or the number of sampled values of the low level LL. The duty cycle information is then outputted to the determining circuit 220 through the duty cycle information signal 215, so the determining circuit 220 may determine the power load of the power supply module 110 according to the duty cycle. According to this embodiment, the counter 214 of the detection circuit 210 counts the number of sampled values of the high level HL and outputs a counted number n(H) as the duty cycle information. As a result, the determining circuit 220 may determine the power load of the power supply module 110 according to the counted number n(H).

In this embodiment, the counter 214 counts the sampled values of the high level HL during a specific time interval Ti to generate the counted number n(H) corresponding to the duty cycle. The specific time interval Ti is timed by the timer 216, where the oscillator 218 provides a reference clock for the timer 216. When the specific time interval Ti expires, the counter 214 resets the counted number n(H) to count the next group of sampled values of the high level HL during the next time interval having the same length as that of the specific time interval Ti.

According to various implementation choices, the specific time interval Ti can be equal to or greater than the pulse period Tp. According to the first embodiment, the specific time interval Ti is equal to the pulse period Tp. The sampling period Ts, i.e., the time interval between a time point when a sampled value is generated and another time point when the next sampled value is generated, can be derived according to the following equation:

$$Ts = 1/Fs$$

Please note that the time interval Ts is less than the pulse period Tp. The accuracy of the duty cycle detection performed by the power load detection device 205 corresponds to the ratio of the pulse period Tp to the time interval Ts. For example, the duty cycle detection performed in a first condition, Tp=10* Ts, is less accurate than that in a second condition, Tp=100* Ts. In the first condition mentioned above, if the counted number n(H) outputted by the counter 214 is three, the duty cycle D1 of the first control signal can be derived according to the following equation:

$$D1 = (n(H)/10)*(Tp/Ti) = (3/10)*(1/1) = 30\%;$$

where the factor (Tp/Ti) can be omitted in this embodiment. In the second condition mentioned above, if the counted number n(H) outputted by the counter 214 is thirty-five, the duty cycle D2 of the first control signal can be derived according to the following equation:

$$D2 = (n(H)/100)*(Tp/Ti) = (35/100)*(1/1) = 35\%;$$

where the factor (Tp/Ti) can be omitted in this embodiment. According to the duty cycle derived in either of the first and second conditions mentioned above, the determining circuit 220 determines the power load utilizing at least one predetermined equation or predetermined lookup table stored in the memory 224, and further outputs a determined result corresponding to the power load through the determined result signal S1. The processor 222 can be a microprocessor. According to another embodiment of the present invention, the determining circuit 220 simply comprises a state machine and a register, in order to perform a predetermined table lookup operation.

According to a variation of the first embodiment, the specific time interval Ti is equal to J times the pulse period Tp, where J is a positive integer greater than one. If Tp=100* Ts, and if the counted number n(H) outputted by the counter 214 is thirty-five, the duty cycle D2 of the first control signal can be derived according to the following equation:

$$D2 = (n(H)/100)*(Tp/Ti) = (35/100)*(1/J) = (35/J) \%.$$

Yet according to another variation of the first embodiment, the specific time interval Ti is equal to K times the pulse period Tp, where K is a positive real number greater than one. If Tp=100*Ts, and if the counted number n(H) outputted by the counter 214 is thirty-five, the duty cycle D2 of the first control signal can be derived according to the following equation:

$$D2 = (n(H)/100)*(Tp/Ti) = (35/100)*(1/K) = (35/K) \%;$$

where the accuracy of this calculation corresponds to the magnitude of K. It is noted that if an erroneous determined result outputted by the determining circuit 220 is considered to be harmless, a simple table lookup operation can be applied to the determining circuit 220. If K is small and K is not close to a positive integer (e.g. K=1.5), the accuracy of this calculation is typically insufficient. If K is large enough (e.g. K=10) or very close to a positive integer (e.g. K=1.1), the accuracy of this calculation is typically sufficient.

Figure 2:
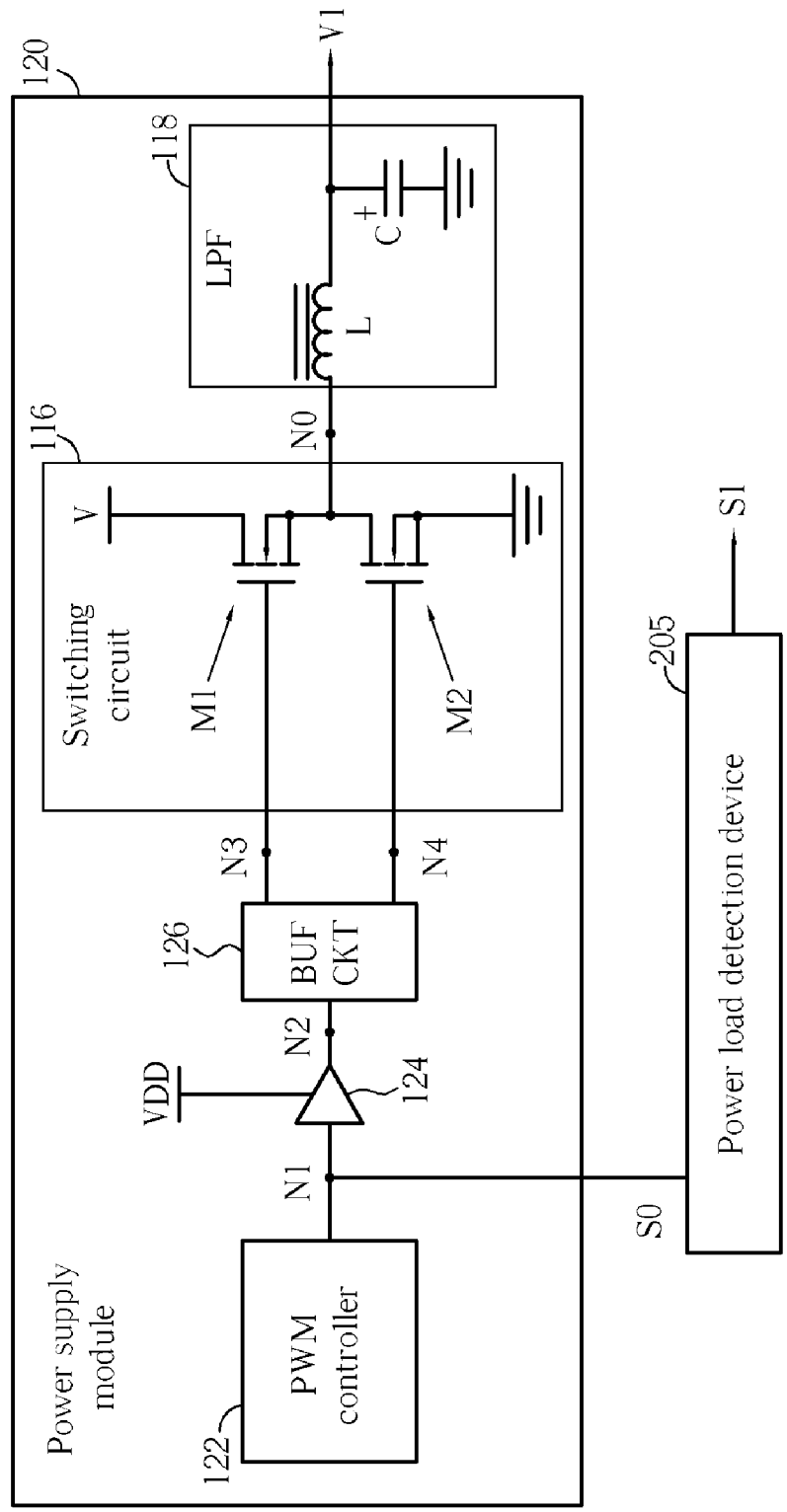
FIG. 2 illustrates the power load detection device shown in FIG. 1 and coupled to another power supply module according to one embodiment of the present invention.

FIG. 2 illustrates the power load detection device 205 shown in FIG. 1 and coupled to another power supply module 120 according to a second embodiment of the present invention. The second embodiment is a variation of the first embodiment. A plurality of node N0, N1, . . . , N4 can be selected as a node for receiving the PWM signal S0, i.e., the input of the power load detection device 205. According to this embodiment, the power load detection device 205 is coupled to the node N1 and receives a third control signal outputted through the node N1 by the PWM controller 122. The PWM controller 122 is similar to the PWM controller 112, and the third control signal is similar to the first control signal of the first embodiment. The buffer circuits 124 and 126 are well known in the art. A signal transmitted through the node N4 is an inverted signal of a signal transmitted through the node N3, i.e., the nodes N3 and N4 correspond to the nodes UGATE and LGATE, respectively.

Figure 3:
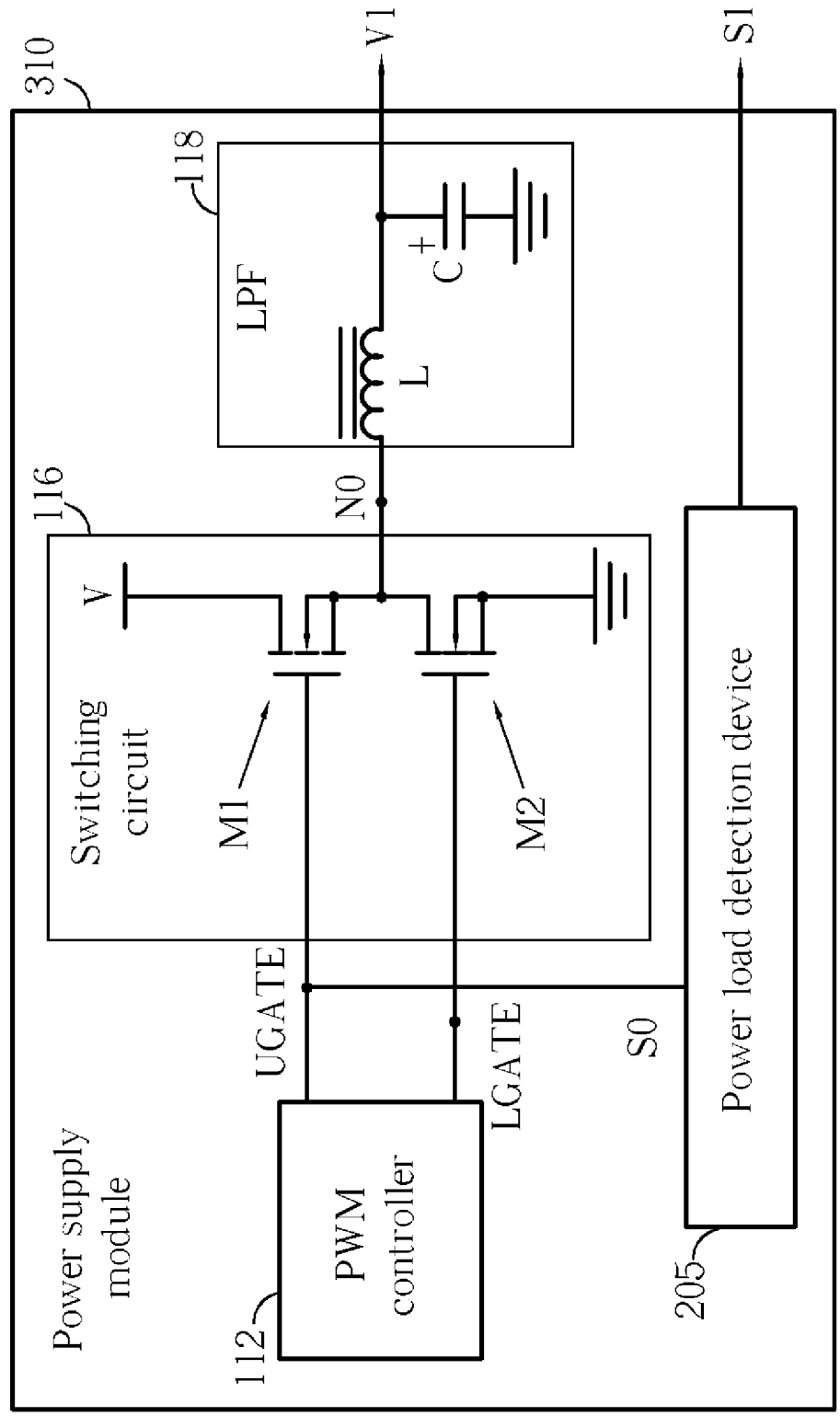
FIG. 3 is a diagram of a power supply module according to one embodiment of the present invention.

FIG. 3 is a diagram of a power supply module 310 according to a third embodiment of the present invention. In this embodiment, the power load detection device 205 is positioned in the power supply module 310, where the PWM controller 112, the switching circuit 116, and the LPF 118 of the power supply module 310 and the operations thereof are disclosed in the first embodiment.

Figure 4:
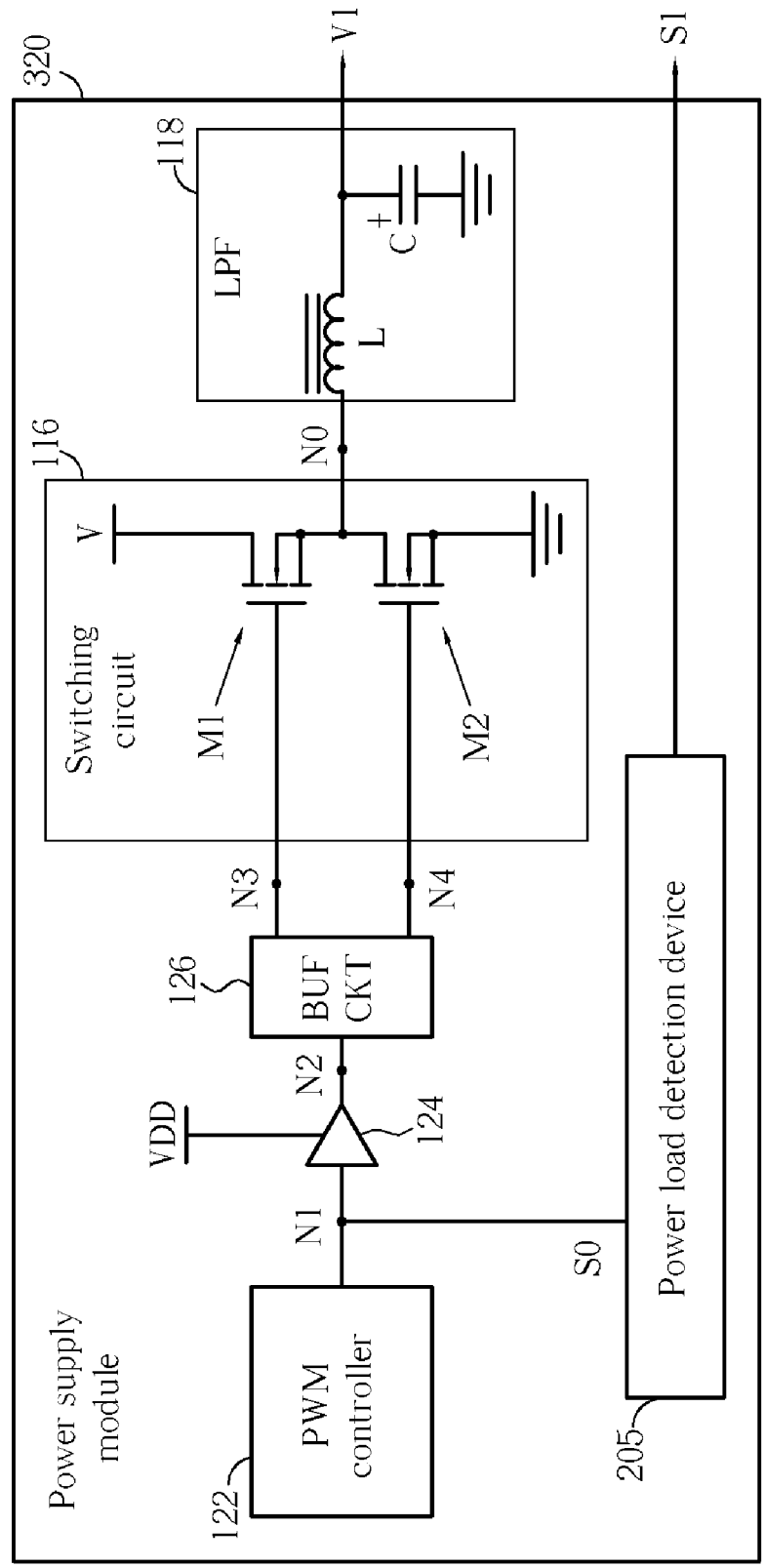
FIG. 4 is a diagram of a power supply module according to one embodiment of the present invention.

FIG. 4 is a diagram of a power supply module 320 according to a fourth embodiment of the present invention. In this embodiment, the power load detection device 205 is positioned in the power supply module 320, where the PWM controller 122, the buffer circuits 124 and 126, the switching circuit 116, and the LPF 118 of the power supply module 320 and the operations thereof are disclosed in the first embodiment or the second embodiment.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting a power load of a power supply module, the method comprising:
   receiving a pulse width modulation (PWM) signal generated by the power supply module, wherein the PWM signal is utilized for controlling a driving voltage outputted from the power supply module;
   sampling the PWM signal to generate a plurality of sampled values, each of the sampled values being at either a first logic level or a second bale level;
   counting sampled values of the first logic level during a specific time interval to generate a counted number corresponding to a duty cycle of the PWM signal; and
   determining the power load of the power supply module according to the counted number.

2. The method of claim 1, wherein the specific time interval is equal to or greater than one cycle of the PWM signal.

3. The method of claim 1, further comprising:
   providing a timer for timing the specific time interval; and
   when the specific time interval expires, resetting the counted number.

4. The method of claim 1, wherein the power supply module is positioned in a computer system.

5. The method of claim 1, wherein the power supply module has a PWM controller, and the method further comprises:
   receiving an output of the PWM controller to be the PWM signal.

6. The method of claim 1, wherein the power supply module has a PWM controller and a buffer circuit coupled to the PWM controller for buffering an output of the PWM controller, and the method further comprises:
   receiving an output of the buffer circuit to be the PWM signal.

7. The method of claim 1, wherein the power supply module has a PWM controller and a switching circuit coupled to the PWM controller for switching an output of the switching circuit between a first voltage and a second voltage according to an output of the PWM controller, and the method further comprises:
   receiving the output of the switching circuit to be the PWM signal.

8. A power load detection device for detecting a power load of a power supply module, the power load detection device comprising:
   a detection circuit receiving a pulse width modulation (PWM) signal generated by the power supply module, the PWM signal being utilized for controlling a driving voltage outputted from the power supply module, the detection circuit comprising:
      a sampler for sampling the PWM signal to generate a plurality of sampled values, each of the sampled values being at either a first logic level or a second logic level; and
      a counter coupled to the sampler for counting sampled values of the first logic level during a specific time interval to generate a counted number corresponding to a duty cycle of the PWM signal; and
   a determining circuit coupled to the detection circuit for determining the power load of the power supply module according to the counted number.

9. The power load detection device of claim 8, wherein the specific time interval is equal to or greater than one cycle of the PWM signal.

10. The power load detection device of claim 8, wherein the detection circuit further comprises:
    a timer coupled to the counter for timing the specific time interval;
    wherein when the specific time interval expires, the counter resets the counted number.

11. The power load detection device of claim 8, wherein the power supply module is positioned in a computer system.

12. The power load detection device of claim 8, wherein the power supply module has a PWM controller, and the detection circuit is coupled to the PWM controller and receives an output of the PWM controller to be the PWM signal.

13. The power load detection device of claim 8, wherein the power supply module has a PWM controller and a buffer circuit coupled to the PWM controller for buffering an output of the PWM controller, and the detection circuit is coupled to the buffer circuit and receives an output of the buffer circuit to be the PWM signal.

14. The power load detection device of claim 8, wherein the power supply module has a PWM controller and a switching circuit coupled to the PWM controller for switching an output of the switching circuit between a first voltage and a second voltage according to an output of the PWM controller, and the detection circuit is coupled to the switching circuit and receives the output of the switching circuit to be the PWM signal.

15. The power load detection device of claim 8, wherein the power load detection device is positioned in the power supply module.

16. A power supply module capable of detecting a power load thereof, the power supply module comprising:
    a pulse width modulation (PWM) controller for generating or controlling a PWM signal, wherein the PWM signal is utilized for controlling a driving voltage outputted from the power supply module;
    a detection circuit coupled to the PWM controller, the detection circuit receiving the PWM signal and comprising:

a sampler for sampling the PWM signal to generate a plurality of sampled values, each of the sampled values being at either a first logic level or a second logic level; and a counter coupled to the sampler for counting sampled values of the first logic level during a specific time interval to generate a counted number corresponding to a duty cycle of the PWM signal; and a determining circuit coupled to the detection circuit for determining the power load of the power supply module according to the counted number.

17. The power supply module of claim 16, wherein the detection circuit receives an output of the PWM controller to be the PWM signal.

18. The power supply module of claim 16, further comprising:

a buffer circuit coupled to the PWM controller for buffering an output of the PWM controller;

wherein the detection circuit is coupled to the buffer circuit and receives an output of the buffer circuit to be the PWM signal.

19. The power supply module of claim 16, further comprising:

a switching circuit coupled to the PWM controller for switching an output of the switching circuit between a first voltage and a second voltage according to an output of the PWM controller;

wherein the detection circuit is coupled to the switching circuit and receives the output of the switching circuit to be the PWM signal.

* * * * *